(12) United States Patent
Yamamura et al.

(10) Patent No.: US 8,485,549 B2
(45) Date of Patent: Jul. 16, 2013

(54) AIRBAG APPARATUS FOR A SIDE WINDOW

(75) Inventors: Daisuke Yamamura, Aichi-ken (JP);
Yuji Sato, Aichi-ken (JP); Shoichi Ibe,
Aichi-ken (JP); Jun Sato, Aichi-ken (JP)

(73) Assignee: Toyoda Gosei Co., Ltd., Aichi-pref. (JP)

( * ) Notice: Subject to any disclaimer, the term of this
patent is extended or adjusted under 35
U.S.C. 154(b) by 85 days.

(21) Appl. No.: 13/191,698

(22) Filed: Jul. 27, 2011

(65) Prior Publication Data
US 2012/0025500 A1 Feb. 2, 2012

(30) Foreign Application Priority Data
Jul. 28, 2010 (JP) ................................. 2010-169412

(51) Int. Cl.
*B60R 21/213* (2011.01)
*B60R 21/232* (2011.01)

(52) U.S. Cl.
USPC ....................... 280/730.2; 280/729; 280/743.1

(58) Field of Classification Search
USPC .............................. 280/729, 730.2, 742, 743.1
See application file for complete search history.

(56) References Cited

U.S. PATENT DOCUMENTS

| | | | | |
|---|---|---|---|---|
| 5,333,899 | A * | 8/1994 | Witte ........................... | 280/730.2 |
| 6,168,191 | B1 * | 1/2001 | Webber et al. ............. | 280/730.2 |
| 6,220,625 | B1 * | 4/2001 | Wallner et al. ............. | 280/730.2 |
| 6,386,578 | B1 * | 5/2002 | Nanbu et al. ................ | 280/730.2 |
| 6,394,487 | B1 * | 5/2002 | Heudorfer et al. .......... | 280/729 |
| 6,450,527 | B2 * | 9/2002 | Kobayashi et al. .......... | 280/729 |
| 6,520,534 | B2 * | 2/2003 | Ritter ........................... | 280/730.2 |
| 6,612,612 | B2 * | 9/2003 | Zerbe .......................... | 280/730.2 |
| 6,695,342 | B2 * | 2/2004 | Tanase et al. ............... | 280/730.2 |
| 6,932,386 | B2 * | 8/2005 | Ikeda et al. .................. | 280/739 |
| 6,971,665 | B2 * | 12/2005 | Tanaka .......................... | 280/729 |
| 7,278,655 | B2 * | 10/2007 | Inoue et al. ................. | 280/730.2 |
| 7,322,600 | B2 * | 1/2008 | Inoue et al. ................. | 280/730.2 |
| 7,350,804 | B2 * | 4/2008 | Bakhsh et al. .............. | 280/730.2 |
| 7,731,227 | B2 * | 6/2010 | Hotta et al. ................. | 280/730.2 |
| 7,770,917 | B2 * | 8/2010 | Henderson et al. ......... | 280/730.2 |
| 7,775,553 | B2 * | 8/2010 | Takemura et al. .......... | 280/730.2 |
| 7,832,760 | B2 * | 11/2010 | Mitsuo et al. ............... | 280/730.2 |
| 7,988,187 | B2 * | 8/2011 | Yamamura et al. ......... | 280/730.2 |
| 8,025,308 | B2 * | 9/2011 | Fletcher et al. ............. | 280/730.2 |
| 2005/0134025 | A1 * | 6/2005 | Ridella et al. ............... | 280/730.2 |
| 2005/0189743 | A1 * | 9/2005 | Bakhsh et al. .............. | 280/730.2 |
| 2010/0032930 | A1 | 2/2010 | Yamamura et al. | |

FOREIGN PATENT DOCUMENTS

| | | | |
|---|---|---|---|
| EP | 1674349 A1 | * | 6/2006 |
| JP | A-2001-328503 | | 11/2001 |
| JP | 2003104162 A | * | 4/2003 |
| JP | 2003182503 A | * | 7/2003 |
| JP | A-2003-237521 | | 8/2003 |
| JP | 2006248298 A | * | 9/2006 |
| JP | A-2008-024129 | | 2/2008 |
| JP | A-2010-36805 | | 2/2010 |

* cited by examiner

*Primary Examiner* — Joseph Rocca
*Assistant Examiner* — Laura Freedman
(74) *Attorney, Agent, or Firm* — Posz Law Group, PLC

(57) ABSTRACT

An airbag apparatus mountable on a vehicle having a side window, a first pillar adjoining the window and a second pillar adjoining the window on the opposite side is disclosed. The airbag apparatus includes an airbag adapted to be housed in an upper edge of the window, and the airbag includes a shutter section that covers the window. The shutter section includes mounting portions that are located above the first and second pillars, an inflatable region comprised of a first pillar side region, a supporting region and a preventing region, and a thin panel region. The thin panel region includes therein a catching point that is intended to catch a vehicle occupant during a rollover event of the vehicle, and the supporting inflatable region and preventing inflatable region surround the catching point continuously at the lower side and on a side of the second pillar.

11 Claims, 13 Drawing Sheets

AIRBAG APPARATUS FOR A SIDE WINDOW

CROSS REFERENCE TO RELATED APPLICATIONS

The Present application claims priority from Japanese Patent Application No. 2010-169412 of Yamamura et al., filed on Jul. 28, 2010, the disclosure of which is hereby incorporated into the present application by reference.

BACKGROUND OF THE INVENTION

1. Field of the Invention

The present invention relates to an airbag apparatus for a side window of a vehicle that so inflates and deploys an airbag as to shut the side window in order to protect a head of an occupant in the event of a side impact, and particularly relates to an airbag apparatus in which an airbag prevents an occupant from ejecting out of the vehicle via the window during a rollover event.

2. Description of Related Art

A known airbag apparatus for a vehicle side window is provided with an airbag mounted on the upper periphery of a window located between front and rear pillars. The airbag includes a shutter section that develops downward from the upper periphery of the window and covers the window on an inboard side thereof.

JP 2001-328503 is illustrative of one such airbag apparatus for a side window. The shutter section of the airbag of the airbag apparatus extends up to below the beltline of a door so as to be supported at the lower end by an interior surface of the vehicle body structure, and thus an ejection of an occupant is securely prevented.

JP2010-36805 discloses an airbag apparatus for a side window wherein a shutter section of its airbag includes at the lower end an inflatable portion that is formed in a doubled fashion and deployable below the beltline of a door so as to hold an occupant from moving to an exterior of a vehicle.

Further, an airbag apparatus for a side window illustrated in JP2003-237521 includes an airbag provided at a first end in a front and rear direction with an oblique inflatable portion that extends obliquely from the bottom to top.

In the airbag apparatuses of JP2001-328503 and JP2010-36805, however, the shutter section has an inflatable portion at the region to be supported by the interior surface of the vehicle body structure below the beltline in addition to the inflatable portion for covering the window. Such a configuration will increase the volume of the airbag and require a bulky and heavy inflator with a large output. Especially if such an airbag is made for a vehicle with three rows of seats for covering all the windows between a front pillar and a rear pillar, an even larger inflator will be required.

It seems that the airbag of JP2003-237521 gives a solution to the above problem because the oblique inflatable portion is partially provided, not over an entire window, and therefore reduces the volume of the airbag. However, the oblique inflatable portion merely acts as a tension belt for generating a tension in a front and rear direction on the lower edge of the airbag, and the oblique and partial arrangement of the oblique inflatable portion provides a void region in front of the oblique inflatable portion. Therefore this airbag is deficient in the event that an occupant's head enters the void region at a side impact.

SUMMARY OF THE INVENTION

An object of the present invention is to provide an airbag apparatus for side a window that does not increase a volume of an airbag but smoothly prevents an outward movement of an occupant.

The object of the invention will be achieved by a following airbag apparatus:

The airbag apparatus is mountable on a vehicle having a side window, a first pillar adjoining the window and a second pillar adjoining the window on the opposite side. The airbag apparatus includes an airbag adapted to be housed in an upper edge of the window and deployable downward when fed with an inflation gas, and the airbag includes a shutter section that covers the window on an inboard side thereof. The shutter section includes:

a plurality of mounting portions that are formed on an upper edge of the shutter section and serve to mount the shutter section on a vehicle body structure, the mounting portions being located at least above and in vicinities of the first and second pillars;

an inflatable region that inflates in a vehicle width direction, the inflatable region includes:

a first pillar side inflatable region that extends vertically and covers the first pillar;

a supporting inflatable region that extends from a lower end of the first pillar side inflatable region, the supporting inflatable region abutting against an interior surface of the vehicle body structure below a beltline of the vehicle by its outboard surface and is thereby supported by the interior surface at airbag deployment; and a preventing inflatable region that extends upward from the supporting inflatable region and is in gas communication with the supporting inflatable region for admitting the inflation gas from the supporting inflatable region, the preventing inflatable region being located in a vicinity of a downstream end of an inflation gas channel of the airbag and including an upper end directed toward the mounting portion located above the second pillar; and a thin panel region that is formed into a thin panel recessing in an outboard direction relative to the inflatable region at airbag deployment, the thin panel region being located between the first pillar side inflatable region and preventing inflatable region and above the supporting inflatable region, and including a catching point that is intended to catch a vehicle occupant during a rollover event of the vehicle.

The supporting inflatable region and preventing inflatable region surround the catching point continuously at the lower side and on a side of the second pillar. The mounting portions located above and in the vicinities of the first and second pillars, the first pillar side inflatable region, the supporting inflatable region, the preventing inflatable region and the thin panel region constitute in combination a preventing element that prevents the occupant from ejecting out of the window during a rollover event of the vehicle.

With the airbag apparatus thus configured, the inflatable region of the shutter section, i.e., the first pillar side inflatable region, the supporting inflatable region and the preventing inflatable region, inflates along with airbag inflation.

The supporting inflatable region inflates along with the inflation of the first pillar side inflatable region in such a manner as to be supported by the first pillar side inflatable region, thereby prevented from moving vertically or horizontally. Thus the supporting inflatable region abuts against the interior surface of the vehicle body structure located below the beltline by its outboard surface and is supported by the interior surface. Since the mounting portion located above the first pillar side inflatable region is secured to the vehicle body structure above the first pillar, the first pillar side inflatable region is prevented from slipping in a vertical direction during deployment. As a result, the first pillar side inflatable region supports the supporting inflatable region in a steady fashion.

The preventing inflatable region is continuous, at the lower end, with the supporting inflatable region supported and positioned by the first pillar side inflatable region and the interior surface, thereby prevented from moving toward an exterior of the vehicle. On the other hand, the upper end of the preventing inflatable region is so configured as to head to the mounting portion which is secured to the vehicle body structure at a position above the second pillar and away from the first pillar side inflatable region, and therefore, the upper end is also prevented from moving toward an exterior of the vehicle.

With the above configuration, in the event of a rollover of a vehicle, if an occupant's head moves outward and hits the catching point of the thin panel region and then attempts to move further outward, the supporting inflatable region located proximate the lower edge of the shutter section will be firstly prevented from slipping upward due to the positioning by the first pillar side inflatable region and support by the interior surface, thereby restrained from overriding the beltline and ejecting out of the window. The preventing inflatable region extending upward from the supporting inflatable region will also be prevented from moving outward at the lower edge supported by the supporting inflatable region and at the upper end located proximate the mounting region secured to the vehicle body structure. When the preventing inflatable region further obtains an inner pressure and inflates into a rod having rigidity, the whole preventing inflatable region will be prevented from moving to an exterior of the vehicle. Since the preventing inflatable region is located in the vicinity of the downstream end of an inflation gas channel of the airbag, it will not let out an inflation gas from the upper end even at contact with an occupant after full airbag inflation, such that a plunge of the inner pressure will not occur. Accordingly, the preventing inflatable region will securely maintain its inner pressure and its fully inflated configuration.

That is, the supporting inflatable region and preventing inflatable region that surround the catching point at the lower side and on the side of the second pillar are prevented from outward movement and prevent an occupant's head caught by the catching point from ejecting out of the window. Moreover, the thin panel region where the catching point is located is recessed in an outboard direction relative to the supporting inflatable region and preventing inflatable region. With this configuration, even in the event that the occupant's head attempts to slip toward the lower edge of the shutter section after hitting the catching point, the head is caught by upper edges of the supporting inflatable region and preventing inflatable region, (i.e., a peripheral edge of the catching point) due to inward bulge of the supporting inflatable region and preventing inflatable region, thereby prevented from ducking under the lower edge of the shutter section and moving toward an exterior of the vehicle.

Moreover, since the supporting inflatable region and preventing inflatable region surrounding the catching point at the lower side and on the side of the second pillar bulge toward an interior of a vehicle by inflation, the supporting inflatable region, the preventing inflatable region and first pillar side inflatable region or thin panel region supported by these inflatable regions will securely catch an occupant's head in a cushioning manner upon a side impact before a rollover event.

Although the thin panel region is thinner than the supporting inflatable region and so on, it is capable of catching an occupant in a cushioning manner due to resilient support by the inflated first pillar side inflatable region, supporting inflatable region and preventing inflatable region.

Furthermore, except the first pillar side inflatable region deployable to cover mainly the first pillar, the inflatable region is comprised of the supporting inflatable region deployable in the vicinity of the beltline and the preventing inflatable region extending upward therefrom in a rod shape. This configuration will reduce the volume of the inflatable region compared to an instance where the inflatable region is so formed as to cover all over the window.

Therefore, the airbag apparatus of the invention is capable of preventing an ejection of an occupant from a vehicle during a rollover event as well as protecting the occupant at a side impact, without increasing the volume of the inflatable region of the shutter section of the airbag.

In the airbag apparatus thus configured, it is desired to locate a portion with a greatest thickness in a vehicle width direction in the supporting inflatable region and preventing inflatable region at a region of the supporting inflatable region to be supported by the interior surface of the vehicle. With this configuration, the supporting inflatable region inflates widely and is supported by the interior surface of the vehicle at airbag inflation in a steady fashion. The preventing inflatable region is then supported by this supporting inflatable region in a stable state during deployment, thereby preventing an ejection of an occupant even more securely.

The thin panel region may be comprised of a noninflatable portion that admits no inflation gas, or may alternatively be comprised of a thin inflatable region that is inflatable with an inflation gas in such a manner as to be thinner than the preventing inflatable region and recess in an outboard direction relative to the preventing inflatable region in such a degree that does not increase the volume of the inflatable region.

Such a configuration will enable the thin inflatable region to absorb an extra inflation gas upon a surge of inner pressure at cushioning an occupant and act as a pressure control chamber for controlling the inner pressure of the airbag.

In such a case, the thin inflatable region may be configured to let in an inflation gas from the first pillar side inflatable region or supporting inflatable region. It may also be configured in gas communication with a vicinity of an upper end of the preventing inflatable region so as to let in an inflation gas from the preventing inflatable region.

Nevertheless if the preventing inflatable region is in gas communication only with the supporting inflatable region and closed at the upper end, an ejection of an occupant will be securely prevented since the preventing inflatable region will not let out an inflation gas from the upper end even at contact with an occupant after full airbag inflation, thereby causing no plunge of the inner pressure and maintaining an inner pressure and a fully inflated configuration of the preventing region. Consequently, the preventing inflatable region will prevent a movement of the occupant in an outboard direction in a steady manner.

If the thin inflatable region is configured in gas communication with the vicinity of the upper end of the preventing inflatable region, an opening area of the inlet port from the preventing inflatable region should be adequately constricted in order to prevent a pressure plunge of the preventing inflatable region and maintain a rigid inflated state of the preventing inflatable region while enabling the thin inflatable region to act as a pressure control chamber for the preventing inflatable region.

The catching point in the thin panel region may be set at an outboard side of a vicinity of the center of gravity of a head of an occupant seated at an inboard side of the window, or at a vicinity of the center of the window.

It is desired that the preventing inflatable region is so configured as to extend obliquely upward from the supporting inflatable region in such a manner as to divide the window front from rear at airbag deployment as viewed from an interior of the vehicle. This configuration will provide a window area in front of and at the rear of the window at airbag deployment, thereby reducing an area of the inflatable region relative to an area of the window to be shut by the shutter section. As a consequence, the inflatable region can be downsized and inflatable with an inflator with a small output, thereby rendering the airbag apparatus light in weight and compact in size.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
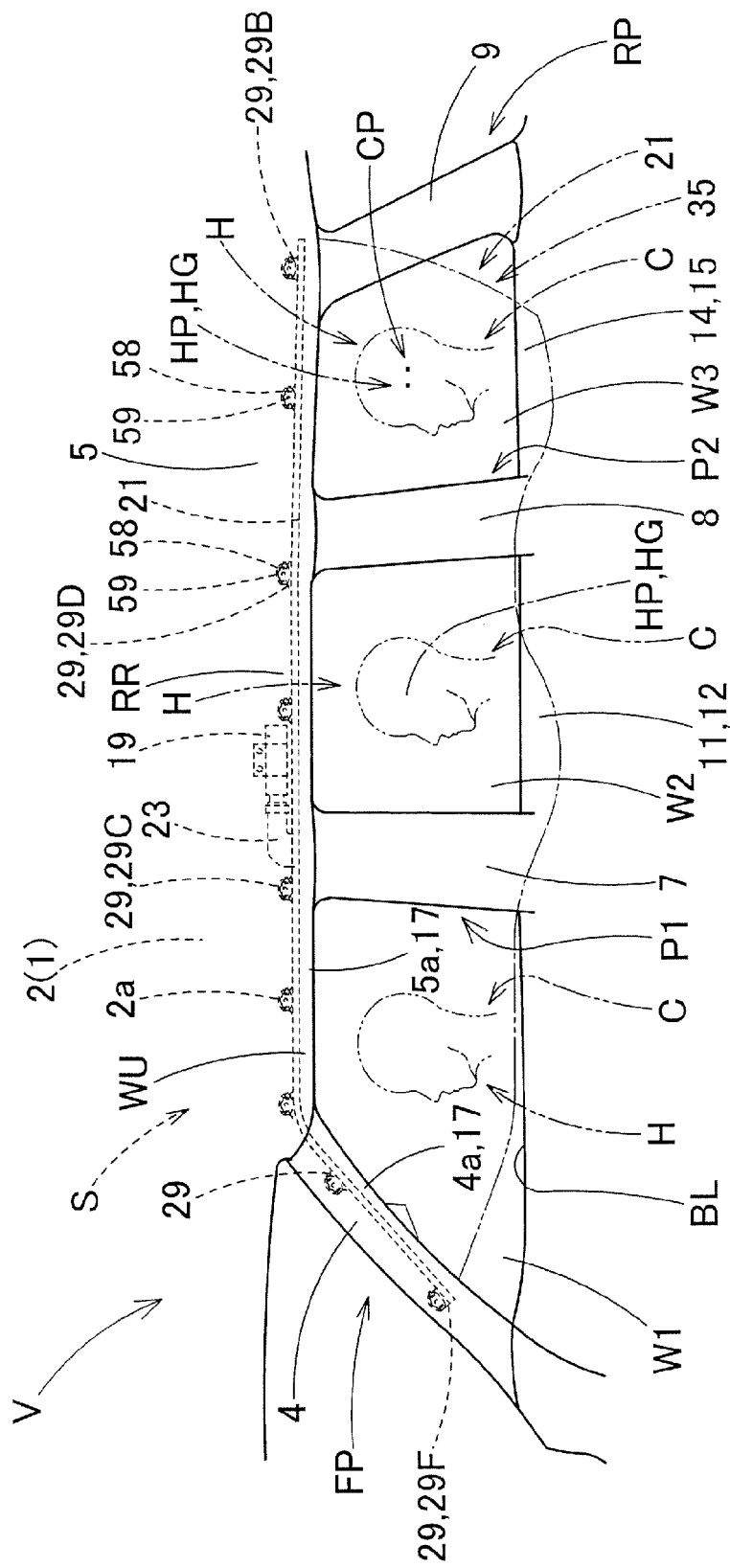
FIG. 1 is a front elevation of an airbag apparatus for a side window embodying the invention in an on-board state, as viewed from an interior of a vehicle.

FIG. 1 depicts an airbag apparatus S embodying the present invention. The airbag apparatus S includes an airbag 21, an inflator 19, mounting brackets 58 and an airbag cover 17. The airbag 21 is housed on the upper periphery WU of side windows 15 W1, W2 and W3 of a vehicle V in a folded-up configuration, specifically from the lower periphery of a front pillar FP through the region above a rear pillar RP, via the regions above middle pillars P1 and P2, on the inboard side of the vehicle V.

As shown in FIG. 1, the inflator 19 has a substantially cylindrical shape and is inserted into and coupled with a later-described gas inlet port 23 of the airbag 21 with a clamp (reference numeral omitted). The inflator 19 is secured to an inner panel 2 at a location of a roof side rail RR above the middle pillar P1 by a mounting bracket (reference numeral omitted), and is covered by a lower edge region 5a of a roof head liner 5. The inner panel 2 is part of a vehicle body structure 1.

Figure 6:
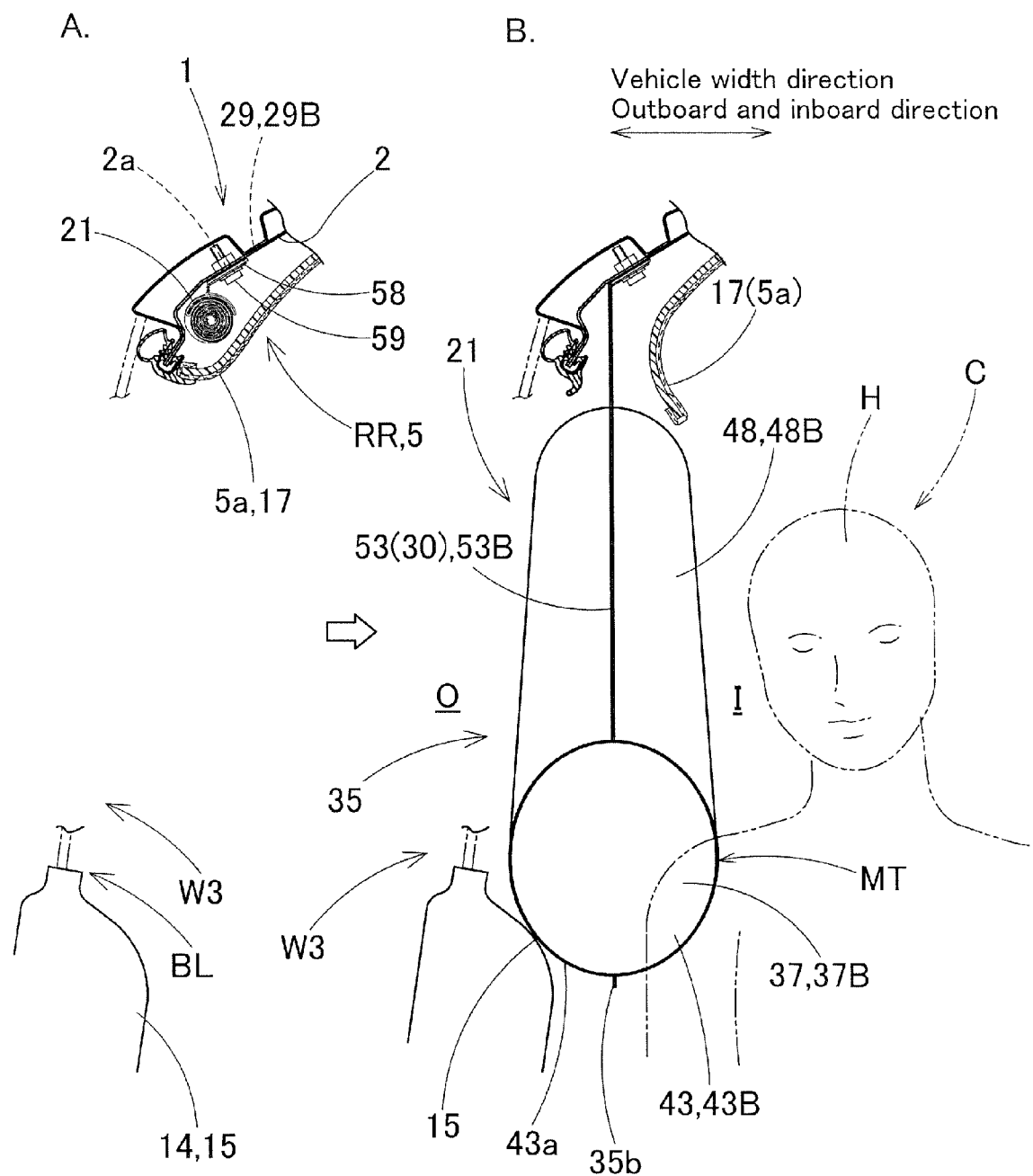
FIG. 6 illustrates the way the airbag apparatus of FIG. 1 operates by schematic vertical sections taken along line VI-VI of FIG. 2.
Figure 7:
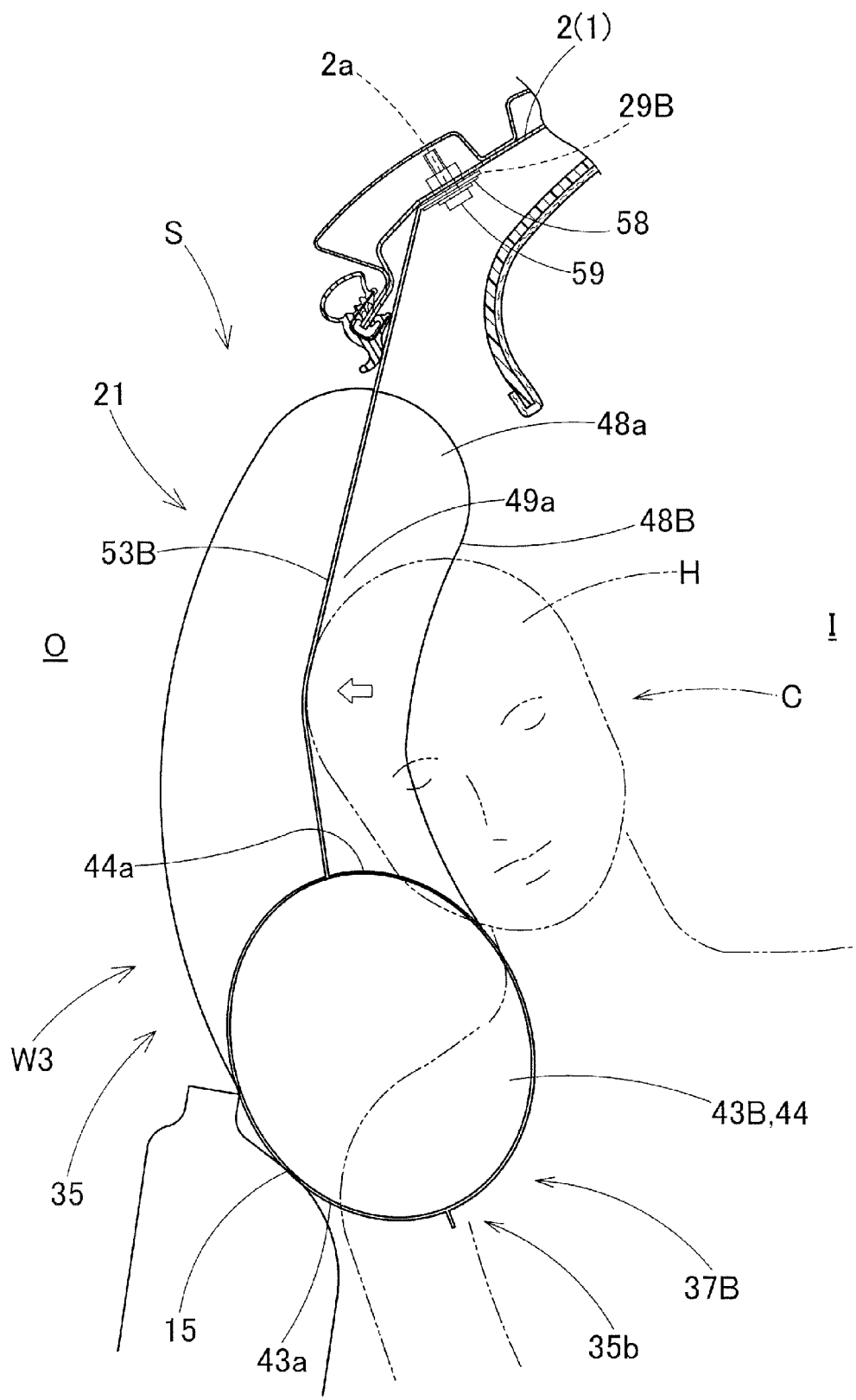
FIG. 7 illustrates a scene following FIG. 6, i.e., the way the airbag catches a vehicle occupant during a rollover event, by a schematic vertical section.

The mounting brackets 58 secure later-described mounting portions 29 of the airbag 21 to the inner panel 2 together with mounting bolts 59 as best shown in FIGS. 6 and 7. The bolts 59 are fastened into screw holes 2a on the inner panel 2 with nuts or the like.

As shown in FIG. 1, the airbag cover 17 is comprised of a lower edge region 4a of a front pillar garnish 4 arranged on the front pillar FP and the lower edge region 5a of the roof head liner 5 arranged on the roof side rail RR.

Figure 2:
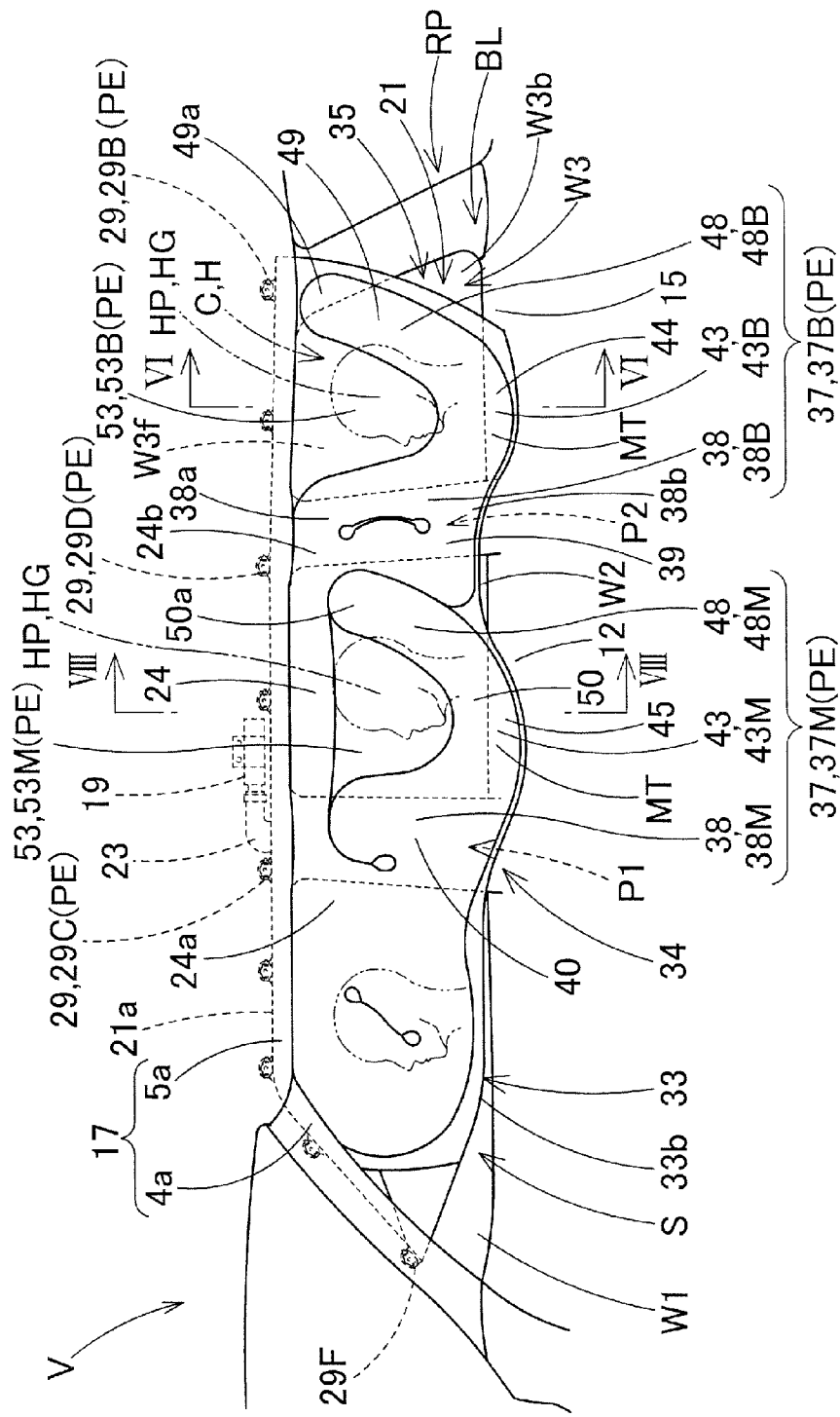
FIG. 2 is a front elevation of the airbag apparatus of FIG. 1 at actuation.
Figure 3:
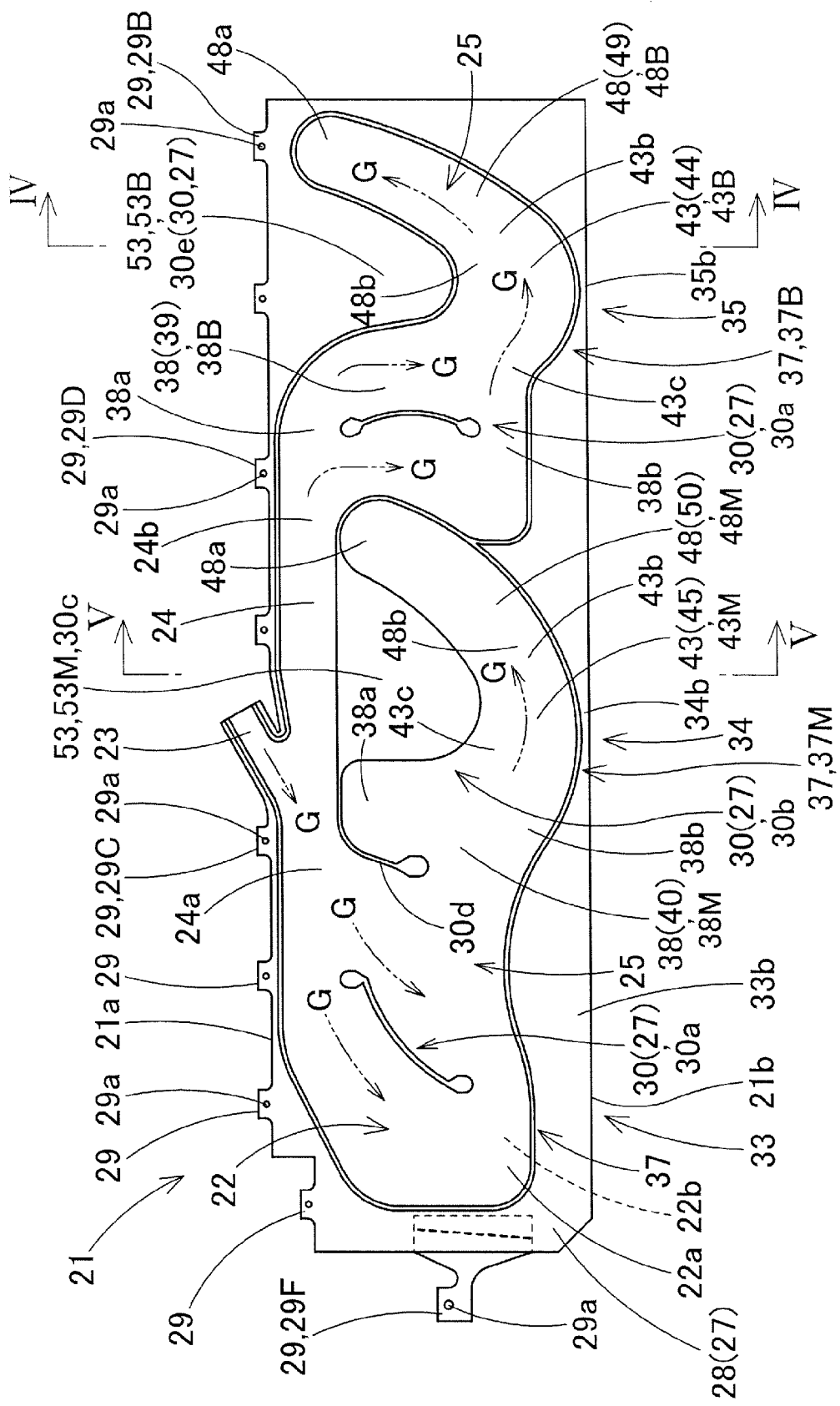
FIG. 3 is a front elevation of an airbag for use in the airbag apparatus of FIG. 1.
Figure 4:
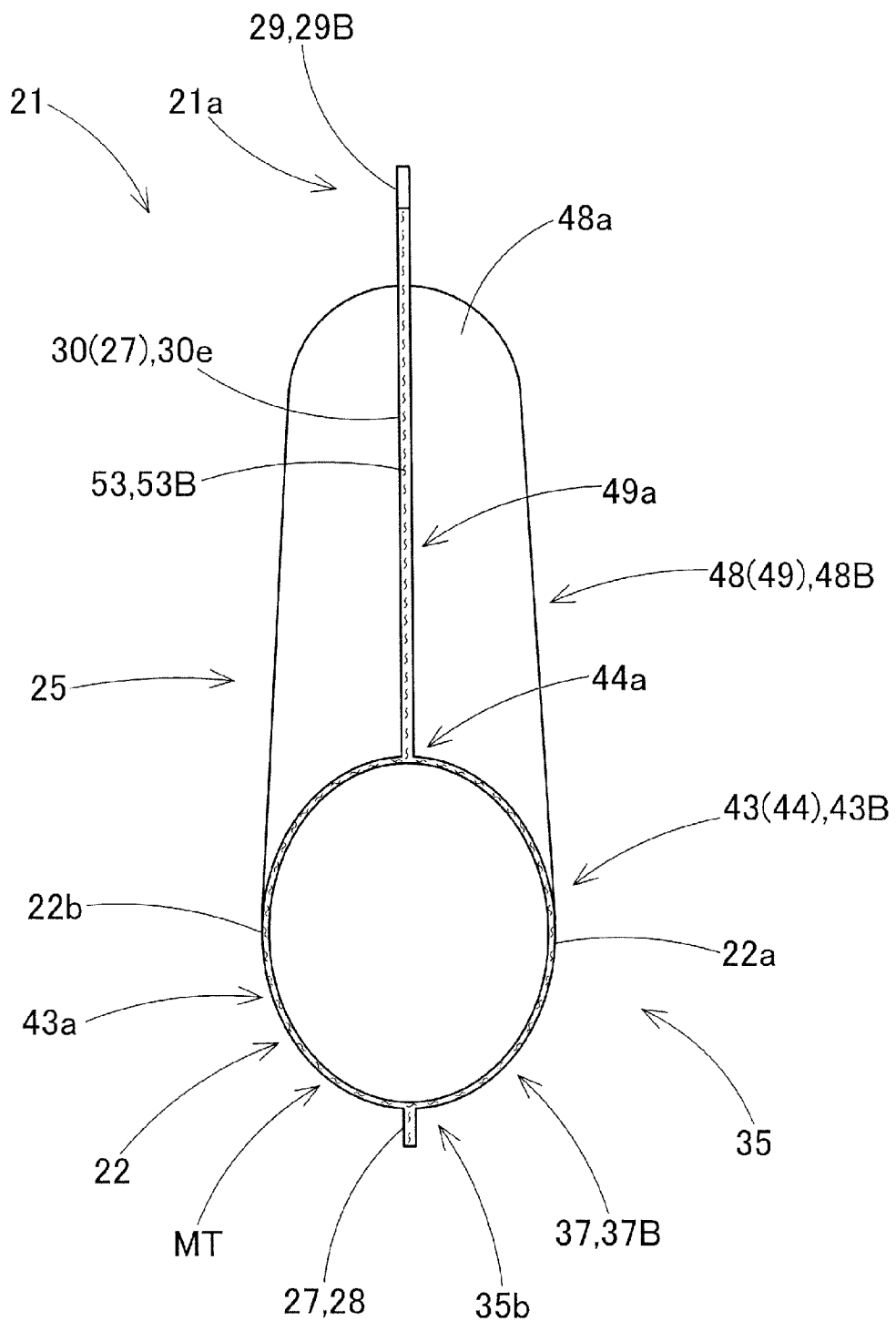
FIG. 4 is a vertical section of the airbag of FIG. 3 at deployment taken along line IV-IV of FIG. 3.
Figure 5:
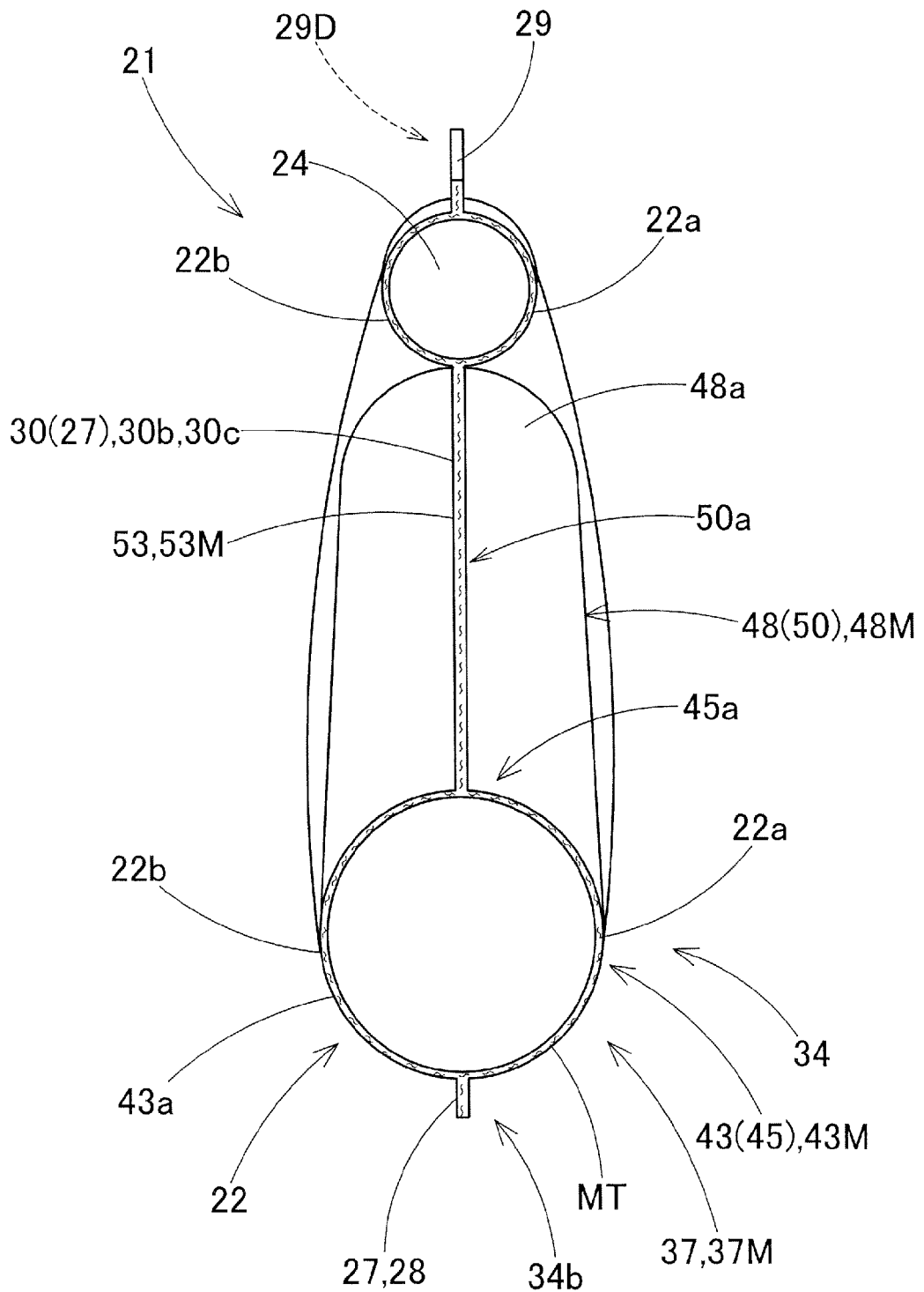
FIG. 5 is a vertical section of the airbag of FIG. 3 at deployment taken along line V-V of FIG. 3.

As shown in FIGS. 1 to 5, the airbag 21 unfolds and deploys when fed with an inflation gas G from the inflator 19 and covers an inboard side I of the windows W1, W2 and W3, the middle pillars P1 and P2 and the rear pillar RP. Referring to FIGS. 3 to 5, the airbag 21 includes a gas admissive region 22 (FIG. 3) inflatable with the inflation gas G by separating an inner panel 22a and an outer panel 22b and a non-admissive region or noninflatable region 27 that admits no inflation gas and keeps the inner panel 22a and outer panel 22b attached together at inflation. The airbag 21 is made of a flexible and foldable fabric. The airbag 21 of this specific embodiment has a hollow-weave or one-piece woven construction of polyamide yarn, polyester yarn or the like except a later-described mounting portion 29F located at the front.

The non-admissive region 27 includes a peripheral region 28, mounting portions 29 and closed regions 30. The peripheral region 28 is arranged around the gas admissive region 22.

The mounting portions 29 are formed in plurality in such a manner as to project upward from the peripheral region 28 at the upper periphery 21a of the airbag 21. The airbag 21 of the illustrated embodiment includes nine such mounting portions 29. Each of the mounting portions 29 is provided with an aperture 29a for receiving the mounting bolt 59 (FIGS. 6 and 7). As described above, the mounting portions 29 are coupled with the mounting brackets 58 and secured to the inner panel 2 by the mounting bolts 59 inserted through the apertures 29a and screwed into the screw holes 2a of the inner panel 2. The mounting portion 29F at the front is prepared separately as a cloth member made of a woven fabric of polyamide or the like and joined to the front end of the airbag 21.

The closed regions 30 includes an island closed region 30a formed separate from the peripheral region 28 in the form of a line and extended closed regions 30b and 30e extended from the peripheral region 28. The extended closed region 30b is comprised of a panel region 30c which is semicircular in shape and a linear region 30d extending from the front end of the panel region 30c in the form of a line. The extended closed region 30e is semicircular in shape protruding downward from the peripheral region 28 at the upper edge 21a of the airbag 21.

The gas admissive portion 22 includes a gas inlet port 23, a gas feed passage 24 and a main inflatable region 25. The gas inlet port 23 is located at an intermediate region of the upper edge 21a of the airbag 21 in a front and rear direction in such a manner as to protrude upward, and is joined with the inflator 19 for admitting an inflation gas G from the inflator 19 and feeding it to the gas admissive portion 22. The gas feed passage 24 extends straightly along the upper edge 21a of the airbag 21, along a front and rear direction of the vehicle V, for feeding the inflation gas G from the inlet port 23 forward and rearward. The main inflatable region 25 is a remainder of the gas admissive region 22 except the gas inlet port 23 and gas feed passage 24, and corresponds to inflatable regions 37 which are inflatable areas of later-described shutter sections 33, 34 and 35. Although not illustrated in the drawings, the gas inlet port 23 is internally provided with a redirecting cloth that extends toward the gas feed passage 24 and includes bifurcated leading ends so the inflation gas G is redirected forward and rearward.

The airbag 21 of this embodiment includes three shutter sections 33, 34 and 35 that respectively cover inboard sides I of the windows W1, W2 and W3 including the pillars P1, P2 and RP. The shutter section 33 is designed deployable on an inboard side I of the window W1 at the side of a front seat and the pillar P1 so as to protect an occupant (including a driver) C seated in the front seat. The shutter section 34 is designed deployable on an inboard side I of the window W2 and the pillars P1 and P2 so as to protect an occupant C seated in a second-row seat. The shutter section 35 is designed deployable on an inboard side I of the window W3 and pillars P2 and RP so as to protect an occupant C seated in a rear seat.

Each of the shutter sections 34 and 35 located on the rear side includes a preventing element PE that prevents an occupant C from ejecting out of an open window W2 or W3 during a rollover event of the vehicle V, i.e., prevents an outward movement of an occupant C. The shutter section 33 located at the front is not provided with such a preventing element PE because it is not likely that a lower edge 33b of the shutter section 33 moves toward an exterior O of the vehicle V owing to a tension line that is formed at airbag inflation between the mounting portion 29F located at a lower side and the mounting portion 29B located rearmost and so acts as to pull the mounting portions 29F and 29B respectively forward and rearward.

Referring to FIGS. 2 to 7, the preventing element PE in the shutter section 35 located rearmost is comprised of the mounting portions 29D, 29B, an inflatable region 37 (37B) and a thin panel region 53 (53B).

The mounting portions 29D and 29B are to be respectively located above and in vicinities of the pillars P2 and RP, in front of and at the rear of the window W3, among the mounting portions 29 serving for attachment to the vehicle body structure 1.

The thin panel region 53B of the shutter section 35 is comprised of the extended closed region 30e.

The inflatable region 37B of the shutter section 35 includes a pillar side region 38 (38B), a supporting region 43 (43B) and a preventing region 48 (48B).

The pillar side region 38B of the shutter section 35 is comprised of a vertical cell 39 that covers an inboard side I of one of the pillars located in front of and at the rear of the window W3, i.e., of the pillar P2 located in the front side, in this embodiment, and extends vertically in a rod shape. The vertical cell 39 extends downward from the rear end 24b of the gas feed passage 24. Further, the vertical cell 39 is provided, in the vicinity of the center in a vertical direction as well as in a front and rear direction, with an island closed region 30a that extends along a vertical direction and prevents the vertical cell 39 from bulging excessively inward.

The supporting region 43B of the shutter section 35 is comprised of a horizontal cell 44 that extends rearward from the lower end 38b of the pillar side region 38B. As shown in FIGS. 4 and 6, at airbag deployment, the supporting region 43B abuts against an interior surface 15 of the vehicle body structure below the beltline BL by its outboard surface 43a and therefore is supported by the interior surface 15.

In this specific embodiment, the interior surface 15 of the vehicle body structure is comprised of a door trim 14 of a rear door.

The preventing region 48B of the shutter section 35 is comprised of an oblique cell 49 that extends upward and rearward from the rear end 43b of the supporting region 43B and has its upper end 48a directed toward the mounting portion 29B to be located in the vicinity of and above the other pillar out of the pillars located in front of and at the rear of the window W3, i.e., the pillar RP located at the rear. The preventing region 48B or vertical cell 49 is designed to let in an inflation gas G from the supporting region 43B and is located in the vicinity of the downstream end of the inflation gas channel of the airbag 21. Especially, the preventing region 48B of this specific embodiment is in gas communication only with the supporting region 43B and is closed at the upper end 48a.

Moreover, the preventing region 48B of this embodiment is designed to deploy in such a manner as to divide the window W3 front from rear as viewed from an interior I of the vehicle. In other words, as shown in FIG. 2, the preventing region 48B so deploys that a front area W3f of the window W3 is located in front of the preventing region 48B while a rear area W3b of the window W3 is located at the rear of the preventing region 48B as viewed from the interior I. Especially, the shutter section 35 of the embodiment is designed not to cover the rear area W3b of the window W3 by not having any inflatable regions at the rear of the preventing region 48B.

The thin panel region 53B comprised of the extended closed region 30e includes therein a catching point HP which is intended to catch an occupant C. Specifically, the shutter section 35 is so designed that the catching point HP is deployable at an outboard side of a vicinity of the center of gravity (head gravity center) HG of a head H of an occupant C seated in a rear seat. This invention assumes that the occupant C is a standard-sized grown man. In other words, the shutter section 35 of the airbag 21 is so designed as to catch the head gravity center HG of the occupant C by the catching point HP located in the thin panel region 53B during a rollover event of a vehicle V.

The supporting region 43B and preventing region 48B described above continuously surround the catching point HP of the thin panel region 53B in the form of V at the lower side and at a side of the rear pillar RP, i.e., at the rear side.

The thin panel region 53B is formed of the closed region 30 or non-admissive portion 27 that admits no inflation gas. Accordingly, as referred to B section of FIG. 6, the thin panel region 53B at airbag deployment is formed into a thin panel recessing in an outboard direction relative to the inflatable region 37B, between the pillar side region 38B and preventing region 48B above the supporting region 43B.

Furthermore, a greatest thickness portion MT in a vehicle width direction in the supporting region 43B and preventing region 48B, specifically the greatest thickness portion MT in a vehicle width direction in a vertical section, is located at a portion of the supporting region 43B to be supported by the interior surface 15 of a vehicle. The greatest thickness portion MT in this embodiment is located proximate the pillar side region 38B.

Referring to FIGS. 2, 3, 5, 8 and 9, the preventing element PE in the shutter section 34 for covering the window W2 is comprised of a mounting portion 29C, the mounting portion 29D, an inflatable region 37 (37M) and a thin panel region 53 (53M).

The mounting portions 29C and 29D are to be respectively located above and in the vicinities of the pillars P1 and P2, in front of and at the rear of the window W2.

The thin panel region 53M of the shutter section 34 is comprised of the panel region 30c of the extended closed region 30b.

The inflatable region 37M of the shutter section 34 includes a pillar side region 38 (38M), a supporting region 43 (43M) and a preventing region 48 (48M).

The pillar side region 38M of the shutter section 34 is comprised of a vertical cell 40 that covers an inboard side I of one of the pillars located in front of and at the rear of the window W2, i.e., of the pillar P1 located in the front side, in this embodiment, and extends vertically in a rod shape. The vertical cell 40 extends vertically under the linear region 30d of the extended closed region 30b in the vicinity of the front end 24a of the gas feed passage 24.

Figure 8:
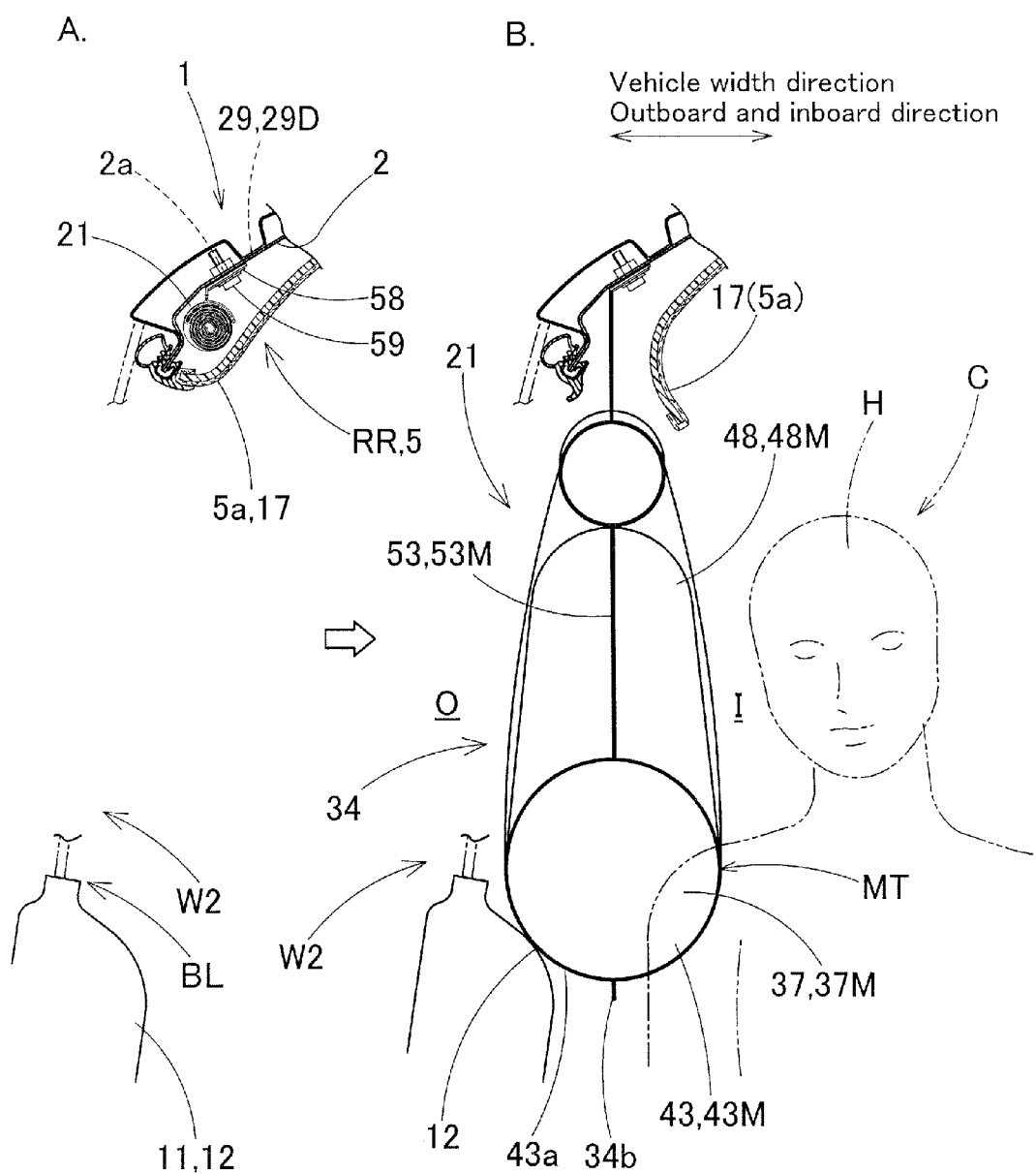
FIG. 8 illustrates the way the airbag apparatus of FIG. 1 operates by schematic vertical sections taken along line VIII-VIII of FIG. 2.

The supporting region 43M of the shutter section 34 is comprised of a horizontal cell 45 that extends rearward from the lower end 38b of the pillar side region 38M. As shown in FIGS. 5 and 8, at airbag deployment, the supporting region 43M abuts against an interior surface 12 of the vehicle body structure below the beltline BL by its outboard surface 43a and therefore is supported by the interior surface 12.

In this specific embodiment, the interior surface 12 of the vehicle body structure is comprised of a door trim 11 of a middle door located between the front seats and rear seats.

The preventing region 48M of the shutter section 34 is comprised of an oblique cell 50 that extends upward and rearward from the rear end 43b of the supporting region 43M and has its upper end 48a directed toward the mounting portion 29D to be located in the vicinity of and above the other pillar out of the pillars located in front of and at the rear of the window W2, i.e., the pillar P2 located at the rear. The preventing region 48M or vertical cell 50 is designed to let in an inflation gas G from the supporting region 43M and is located in the vicinity of the downstream end of the inflation gas channel of the airbag 21. Especially, the preventing region 48M of this specific embodiment is in gas communication only with the supporting region 43M, and the upper end 48a is closed beneath the gas feed passage 24 and in front of the vertical cell 39 of the shutter section 35.

The thin panel region 53M comprised of the panel region 30c also includes therein a catching point HP which is intended to catch an occupant C (a standard-sized grown man). The catching point HP of the shutter section 34 is also designed deployable at an outboard side of the vicinity of the center of gravity (head gravity center) HG of a head H of the occupant C seated in a second-row seat. In other words, the shutter section 34 is so designed as to catch the head gravity center HG of the occupant C at the catching point HP located in the thin panel region 53M during a rollover event of a vehicle V.

The supporting region 43M and preventing region 48M described above continuously surround the catching point HP of the thin panel region 53M in the form of V at the lower side and at a side of the pillar P2, i.e., at the rear side.

The thin panel region 53M is also formed of the closed region 30 or non-admissive portion 27 that admits no inflation gas. Accordingly, as referred to B section of FIG. 8, the thin panel region 53M at airbag deployment is formed into a thin panel recessing in an outboard direction relative to the inflatable region 37M, between the pillar side region 38M and preventing region 48M above the supporting region 43M.

Furthermore, a greatest thickness portion MT in a vehicle width direction in the supporting region 43M and preventing region 48M, in a vertical section, is located at a portion of the supporting region 43M to be supported by the interior surface 12 of a vehicle. The greatest thickness portion MT is located proximate the pillar side region 38M.

Mounting of the airbag apparatus S on a vehicle V is now described. Firstly, the airbag 21 in a flattened state is folded up in such a manner as to bring the lower edge 21b close to the upper edge 21a having the mounting portions 29. In this specific embodiment, the gas feed passage 24 is folded in a bellows fashion whereas a region below the gas feed passage 24 is rolled. Then the airbag 21 is wrapped up by a tearable wrapping member (not shown in the drawings) for keeping the folded-up configuration. Subsequently, the inflator 19 is joined to the gas inlet port 23 of the airbag 21 with the above-described clamp, and the mounting brackets 58 are attached to the mounting portions 29 of the airbag 21, thereby forming an airbag module.

Thereafter, the mounting brackets 58 are located and fastened on predetermined locations on the inner panel 2 of the vehicle body structure 1 by inserting the mounting bolts 59 into the mounting holes 29a. Then a not-shown lead wire extending from a suitable control for actuating the inflator is connected to the inflator 19. If then the front pillar garnish 4, the roof head liner 5, middle pillar garnishes 7 and 8 and a rear pillar garnish 9 are attached to the vehicle body structure 1, the airbag apparatus S is mounted on the vehicle V.

When the inflator 19 is actuated after the airbag apparatus S is mounted on the vehicle V, an inflation gas G is discharged from the inflator 19 and flows through the gas inlet port 23 and flows toward the front and rear along the gas feed passage 24, as indicated by double-dashed lines in FIG. 3. The gas G then flows into the main inflatable region 25, such that the main inflatable region 25 inflates and tears the wrapping member and pushes and opens the airbag cover 17 constructed of the lower edge regions 4a and 5a of the front pillar garnish 4 and roof head liner 5. Thus the airbag 21 deploys downward and covers an inboard side I of the side windows W1, W2 and W3, the middle pillars P1, P2 and the rear pillar RP as shown in FIG. 1 (double-dashed lines) and FIG. 2.

At full deployment of the airbag 21, the inflatable region 37B of the shutter section 35, i.e., the pillar side region 38B, the supporting region 43B and the preventing region 48B, inflate as well as shown in FIG. 6.

The supporting region 43B inflates along with the inflation of the pillar side region 38B in such a manner as to be supported by the pillar side region 38B, thereby prevented from moving vertically or horizontally. Thus the supporting region 43B abuts against the interior surface 15 located below the beltline BL by the outboard surface 43a and is supported by the interior surface 15. Since the mounting portion 29D located above the pillar side region 38B is secured to the vehicle body structure 1 above the pillar P2 (FIG. 2), the pillar side region 38B is prevented from slipping in a vertical direction during deployment. As a result, the pillar side region 38B supports the supporting region 43B in a steady fashion.

In the preventing region 48B, since the lower end 48b (FIG. 3) is continuous with the supporting region 43B supported and positioned by the pillar side region 38B and interior surface 15, the preventing region 48B is prevented from moving toward an exterior O of the vehicle. On the other hand, the upper end 48a is so configured as to head to the mounting portion 29B which is secured to the vehicle body structure 1 at a position above the pillar RP and away from the pillar side region 38B, and therefore, the upper end 48a is also prevented from moving toward an exterior O of the vehicle.

With the above configuration, in the event of a rollover of a vehicle V, if an occupant's head H moves outward and hits the catching point HP of the thin panel region 53B and then attempts to move further outward, the supporting region 43B located proximate the lower edge 35b of the shutter section 35 will be firstly prevented from slipping upward due to the positioning by the pillar side region 38B and support by the interior surface 15, thereby restrained from overriding the beltline BL and ejecting out of the window W3, as shown in FIG. 7. The preventing region 48B extending upward from the supporting region 43B will also be prevented from moving outward at the lower edge 48b supported by the supporting region 43B and at the upper end 48a located proximate the mounting region 29B secured to the vehicle body structure 1. When the preventing region 48B further obtains an inner pressure and inflates into a rod having rigidity, the whole preventing region 48B will be prevented from moving to an exterior O of the vehicle. Since the preventing region 48B is located in the vicinity of the downstream end of an inflation gas channel of the airbag 21, it will not let out an inflation gas G from the upper end 48a even at contact with an occupant C after full airbag inflation, such that a plunge of the inner pressure will not occur. Accordingly, the preventing region 48B will securely maintain its inner pressure and its fully inflated configuration.

Here, in the gas admissive region 22 of the airbag 21, an area ranging from the gas inlet port 23 to the gas feed passage 24 forms an upstream region of the inflation gas channel, whereas areas to the shutter sections 33, 34 and 35 relative to the gas feed passage 24 form downstream regions of the gas channel. In the shutter section 35, the inflation gas firstly flows from the upper end 38a to the lower end 38b of the pillar side region 38B, and then flows into the front end 43c of the supporting region 43B. Subsequently the gas G flows from the rear end 43b of the supporting region 43B and then into the lower end 48b of the preventing region 48B. Therefore, the preventing region 48B is located in the vicinity of the downstream end of the inflation gas channel of the whole airbag 21.

That is, the supporting region 43B and preventing region 48B that surround the catching point HP at the lower side and on the side of the rear pillar RP are prevented from outward movement and prevent an occupant's head H caught by the catching point HP from ejecting out of the window W3. Moreover, the thin panel region 53B where the catching point HP is located is recessed in an outboard direction relative to the supporting region 43B and preventing region 48B. With this configuration, even in the event that the occupant's head H attempts to slip toward the lower edge 35b of the shutter section 35 after hitting the catching point HP, the head H is caught by upper edges 44a and 49a of the supporting region 43B and preventing region 48B, (i.e., a peripheral edge of the catching point HP) due to inward bulge of the supporting region 43B and preventing region 48B, thereby prevented from ducking under the lower edge 35b of the shutter section 35 and moving toward an exterior O of the vehicle. As described above, being located in the vicinity of the downstream end of the inflation gas channel of the whole airbag 21, the preventing region 48B will not let out an inflation gas G from the upper end 48a even at contact with an occupant C after full airbag inflation, thereby causing no plunge of the inner pressure. Accordingly, the preventing region 48B will securely maintain its fully inflated configuration and prevent an outward movement of the occupant C.

Moreover, since the supporting region 43B and preventing region 48B surrounding the catching point HP at the lower side and rear side bulge toward an interior I of a vehicle by inflation, the supporting region 43B, the preventing region 48B and pillar side region 38B or thin panel region 53B supported by these inflatable regions 37B securely catch an occupant's head H in a cushioning manner upon a side impact before a rollover event.

Although the thin panel region 53B is thinner than the supporting region 43B and so on, it is capable of catching an occupant C in a cushioning manner due to resilient support by the inflated pillar side region 38B, supporting region 43B and preventing region 48B.

Furthermore, except the pillar side region 38B deployable to cover mainly the pillar P2, the inflatable region 37B is comprised of the supporting region 43B deployable in the vicinity of the beltline BL and the preventing region 48B extending upward therefrom in a rod shape. This configuration will reduce the volume of the inflatable region 37B compared to an instance where the inflatable region is so formed as to cover all over the window W3.

In a similar manner to the shutter section 35, the inflatable region 37M of the shutter section 34, i.e., the pillar side region 38M, the supporting region 43M and the preventing region 48M, inflates as well at airbag deployment as shown in FIG. 8.

The supporting region 43M inflates along with the inflation of the pillar side region 38M in such a manner as to be supported by the pillar side region 38M, thereby prevented from moving vertically or horizontally. Thus the supporting region 43M abuts against the interior surface 12 of a vehicle located below the beltline BL by the outboard surface 43a and is supported by the interior surface 12. Since the mounting portion 29C located above the pillar side region 38M is secured to the vehicle body structure 1 above the pillar P1 (FIG. 2), the pillar side region 38M is prevented from slipping in a vertical direction during deployment. As a result, the pillar side region 38M supports the supporting region 43M in a steady fashion.

In the preventing region 48M, since the lower end 48b (FIG. 3) is continuous with the supporting region 43M supported and positioned by the pillar side region 38M and interior surface 12, the preventing region 48M is prevented from moving toward an exterior O of the vehicle. On the other hand, the upper end 48a is so configured as to head to the mounting portion 29D which is secured to the vehicle body structure 1 at a position above the pillar P2 and away from the pillar side region 38M, and therefore, the upper end 48a is also prevented from moving toward an exterior O of the vehicle.

Figure 9:
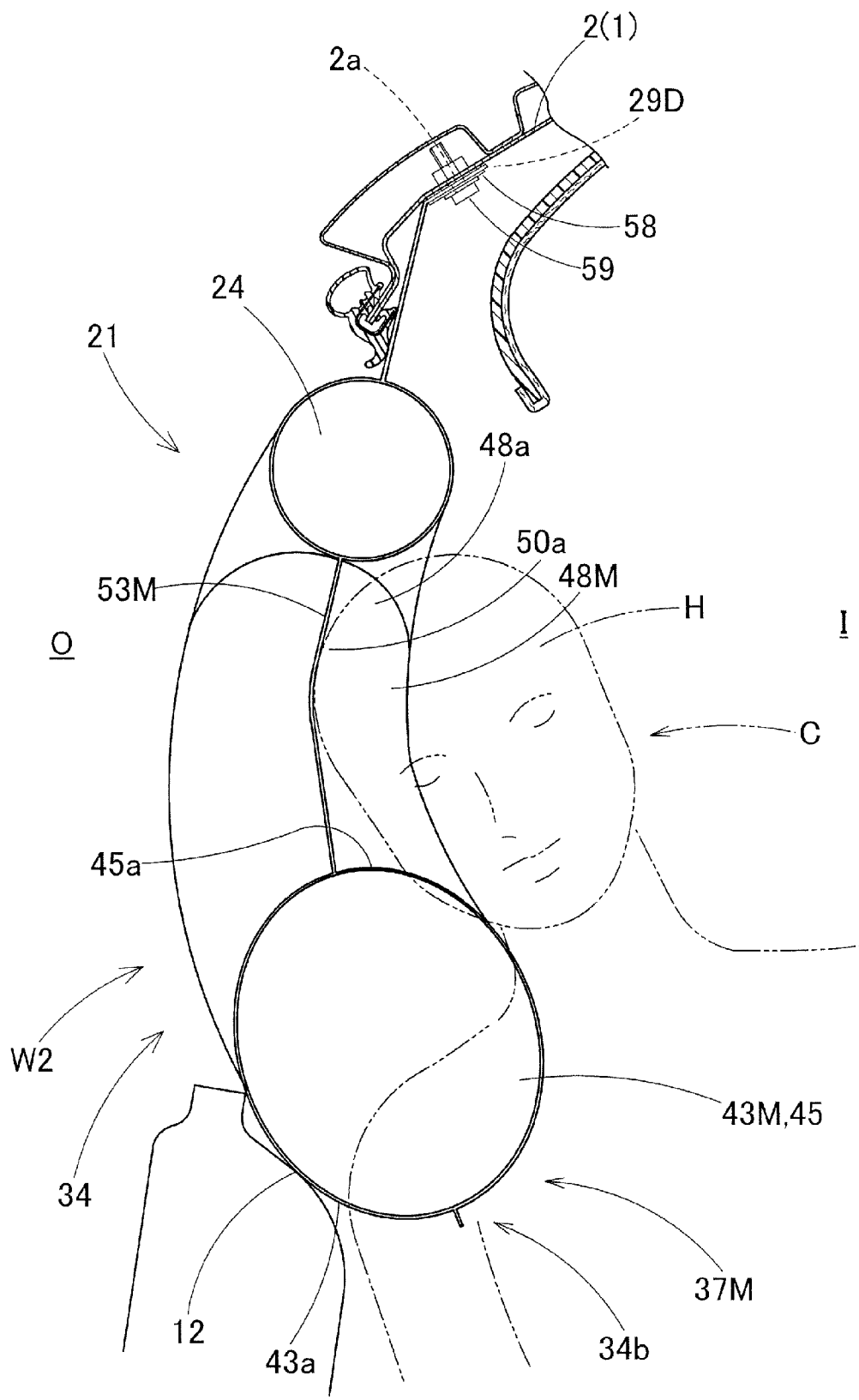
FIG. 9 illustrates a scene following FIG. 8, i.e., the way the airbag catches a vehicle occupant during a rollover event, by a schematic vertical section.

With the above configuration, in the event of a rollover, if an occupant's head H moves outward and hits the catching point HP of the thin panel region 53M and then attempts to move further outward, the supporting region 43M located proximate the lower edge 34b of the shutter section 34 will be firstly prevented from slipping upward due to the positioning by the pillar side region 38M and support by the interior surface 12, thereby restrained from overriding the beltline BL and ejecting out of the window W2, as shown in FIG. 9. The preventing region 48M extending upward from the supporting region 43M will also be prevented from moving outward at the lower edge 48b supported by the supporting region 43M and at the upper end 48a located proximate the mounting region 29D secured to the vehicle body structure 1. When the preventing region 48M further obtains an inner pressure and inflates into a rod having rigidity, the whole preventing region 48M will be prevented from moving to an exterior O of the vehicle. Since the preventing region 48M is located in the vicinity of the downstream end of an inflation gas channel of the airbag 21, it will not let out an inflation gas G from the upper end 48a even at contact with an occupant C after full airbag inflation, such that a plunge of the inner pressure will not occur. Accordingly, the preventing region 48M will securely maintain its fully inflated configuration. Here, in the shutter section 34, the pillar side region 38M admits an inflation gas G flown from the front end 24a of the gas feed passage 24 via the lower end 38b, and then inflates to the upper end 38a. Then the gas flows into the supporting region 43M via the lower end 38b of the pillar side region 38M and then flows into the preventing region 48M via the rear end 43b of the supporting region 43M. Therefore, the preventing region 48M is located in the vicinity of the downstream end of the inflation gas channel of the whole airbag 21, similarly to the preventing region 48B.

That is, at a rollover event of a vehicle V, the supporting region 43M and preventing region 48M that surround the catching point HP at the lower side and rear side are prevented from outward movement and thus prevent an occupant's head H caught by the catching point HP from ejecting out of the window W2. Moreover, the thin panel region 53M where the catching point HP is located is recessed in an outboard direction relative to the supporting region 43M and preventing region 48M. With this configuration, even in the event that the occupant's head H attempts to slip toward the lower edge 34b of the shutter section 34 after hitting the catching point HP, the head H is caught by upper edges 45a and 50a of the supporting region 43M and preventing region 48M, (i.e., a peripheral edge of the catching point HP) due to inward bulge of the supporting region 43M and preventing region 48M as shown in FIG. 9, thereby prevented from ducking under the lower edge 34b of the shutter section 34 and moving toward an exterior O of the vehicle. As described above, being located in the vicinity of the downstream end of the inflation gas channel of the whole airbag 21, the preventing region 48M will not let out an inflation gas G from the upper end 48a even at contact with an occupant C after full airbag inflation, thereby causing no plunge of the inner pressure. Accordingly, the preventing region 48M will securely maintain its fully inflated configuration and prevent an outward movement of the occupant C.

Moreover, since the supporting region 43M and preventing region 48M surrounding the catching point HP at the lower side and rear side bulge toward an interior I of a vehicle by inflation, the supporting region 43M, preventing region 48M and pillar side region 38M or the thin panel region 53M securely catch an occupant's head H in a cushioning manner upon a side impact before a rollover event.

Furthermore, except the pillar side region 38M deployable to cover mainly the pillar P1, the inflatable region 37M is comprised of the supporting region 43M deployable in the vicinity of the beltline BL and the preventing region 48M extending upward therefrom in a rod shape. This configuration will reduce the volume of the inflatable region 37M compared to an instance where the inflatable region is so formed as to cover the window W2 all over.

Therefore, the airbag apparatus S of the embodiment is capable of preventing an ejection of an occupant C from a vehicle V during a rollover event as well as protecting the occupant C at a side impact, without increasing volumes of the inflatable regions 37M and 37B of the shutter sections 34 and 35 of the airbag 21.

In each of the shutter sections 34 and 35 of the airbag apparatus S of the embodiment, a portion in the supporting inflatable region 43M/43B and preventing inflatable region 48M/48B with a greatest thickness in a vehicle width direction, i.e., the greatest thickness portion MT, is located at a region of the supporting region 43M/43B to be supported by the interior surface 12/15 of the vehicle. With this configuration, the supporting region 43M/43B inflates widely and is supported by the interior surface 12/15 at airbag inflation in a steady fashion. The preventing region 48M/48B is supported by this supporting region 43M/43B in a stable state during deployment, thereby preventing an ejection of an occupant C even more securely.

Moreover, the preventing inflatable region 48B is so formed as to extend obliquely upward from the supporting inflatable region 43B and divide the window W3 front from rear as viewed from an interior I at airbag deployment. This configuration will provide a window area (i.e., a front area W3f and a rear area W3b, as referred to FIG. 2) in front of and at the rear of the window W3 at airbag deployment, thereby reducing an area of the inflatable region 37B relative to an area of the window W3 to be shut by the shutter section 35. As a consequence, the inflatable region 37B can be downsized and inflatable with an inflator with a small output, thereby rendering the airbag apparatus S light in weight and compact in size.

Figure 10:
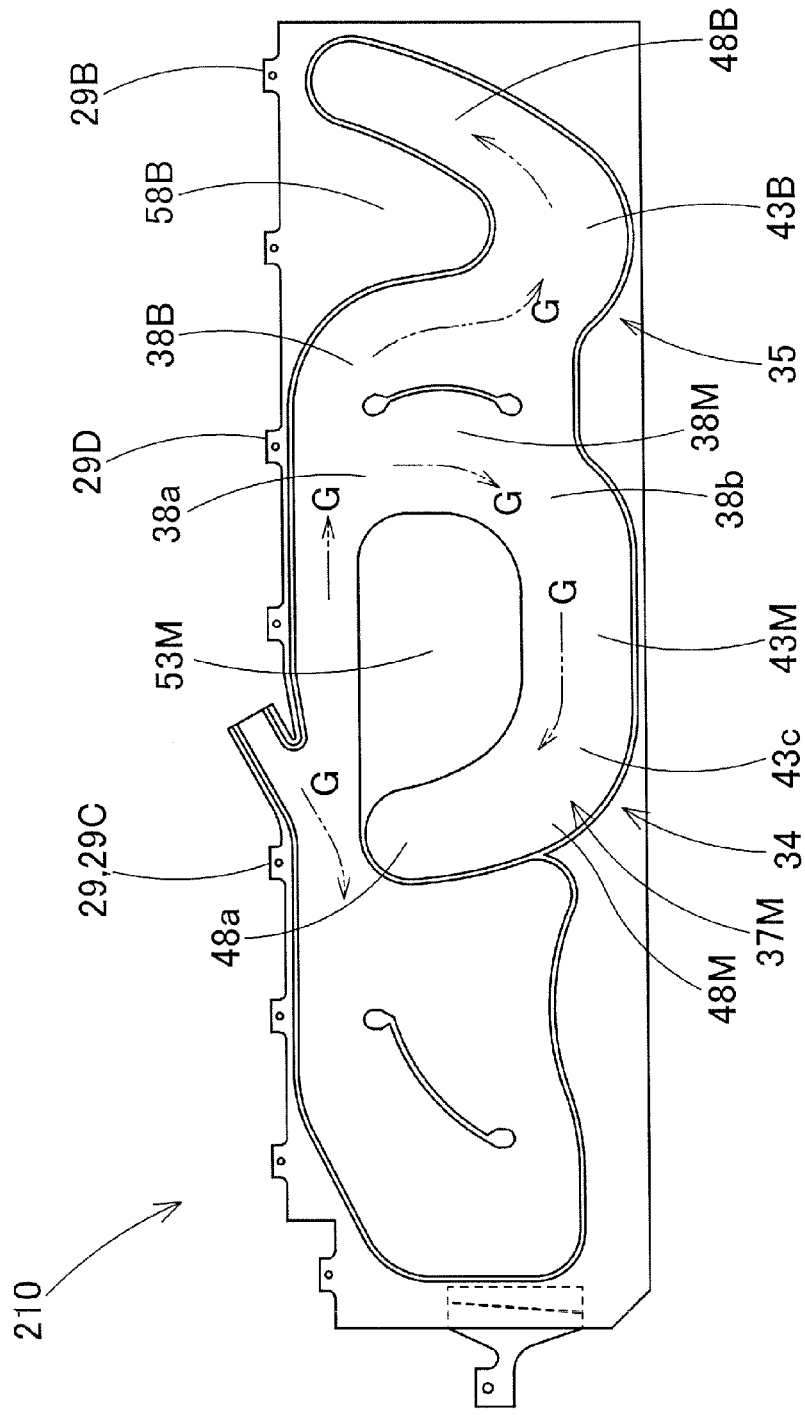
FIG. 10 is a front elevation of a modification of the airbag.
Figure 11:
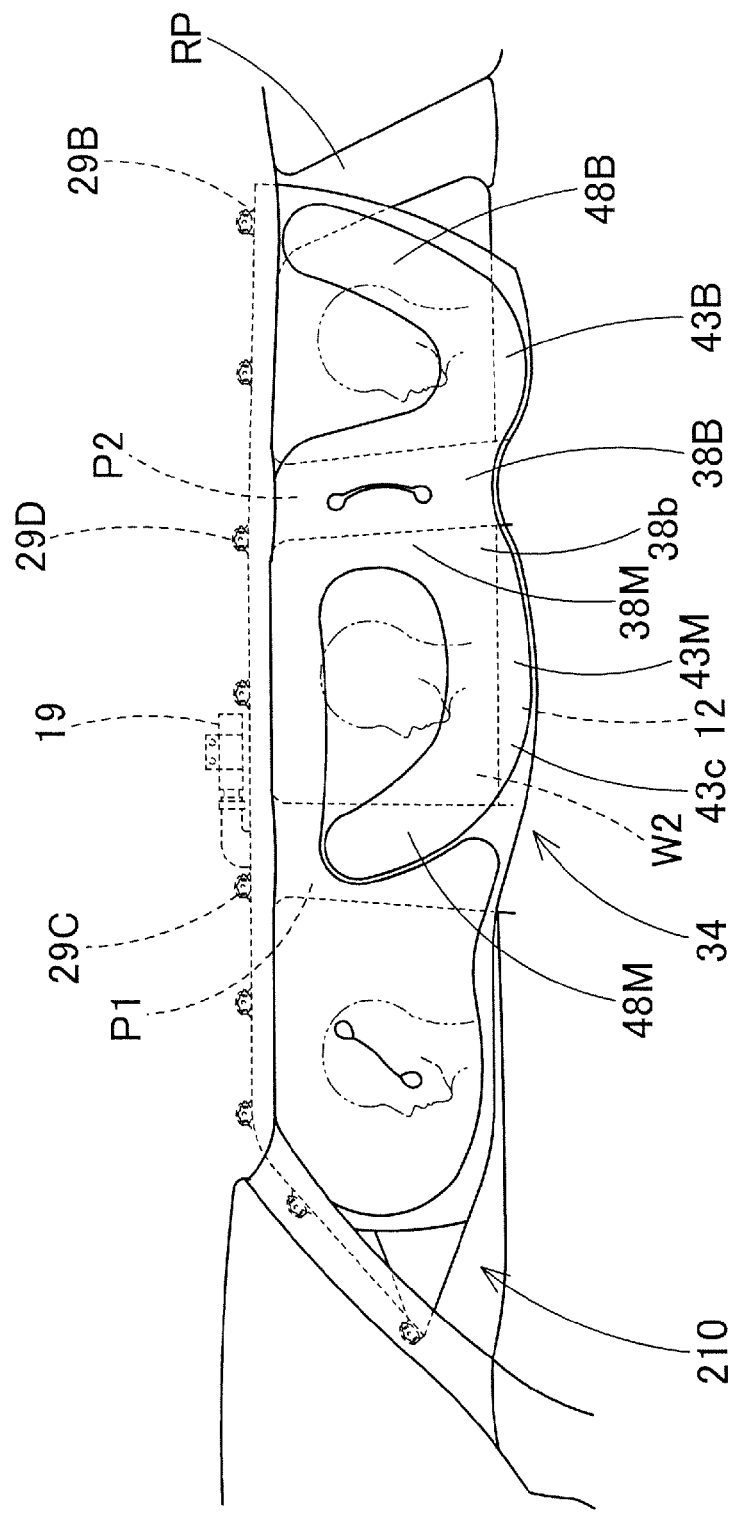
FIG. 11 is a front elevation of the airbag of FIG. 10 at deployment, as viewed from an interior of a vehicle.

In the foregoing embodiment, the pillar side region 38M/38B, the supporting region 43M/43B and the preventing regions 48M/48B of the shutter section 34/35 are disposed in order from the front to rear. However, it will also be appreciated that a pillar side region, a supporting region and a preventing region are disposed in order from the rear to front. By way of example, the airbag 21 of the foregoing embodiment can be mounted on a vehicle back to front. Alternatively, as in an airbag 210 shown in FIGS. 10 and 11, a shutter section 34 for covering the window W2 may be so configured that a supporting region 43M extends forward from the lower end 38b of a pillar side region 38M and a preventing region 48M extends obliquely upward toward a mounting portion 29C from the front end 43c of the supporting region 43M.

In the foregoing embodiments, the pillar side region extends obliquely upward and forward from the supporting region whereas the preventing region extends obliquely upward and rearward from the supporting region, and thus the pillar side region, supporting region and preventing region form a V-shape as viewed from an interior I of a vehicle. Other than that, these inflatable regions of the shutter section may also be so configured as to form a U-shape wherein a supporting region extends along a front and rear direction of the beltline from a pillar side region and a preventing region extends upward from either rear or front end of the supporting region.

Further, the thin panel region 53 of the foregoing embodiments is comprised of the closed region 30 or noninflatable region (non-admissive region) 27 that admits no inflation gas G. However, the thin panel region may also be comprised of a thin inflatable region that is inflatable with an inflation gas in such a manner as to be thinner than the preventing region 48 and recess in an outboard direction relative to the preventing region 48 in such a degree that does not increase the volume of the inflatable region 37.

Figure 12:
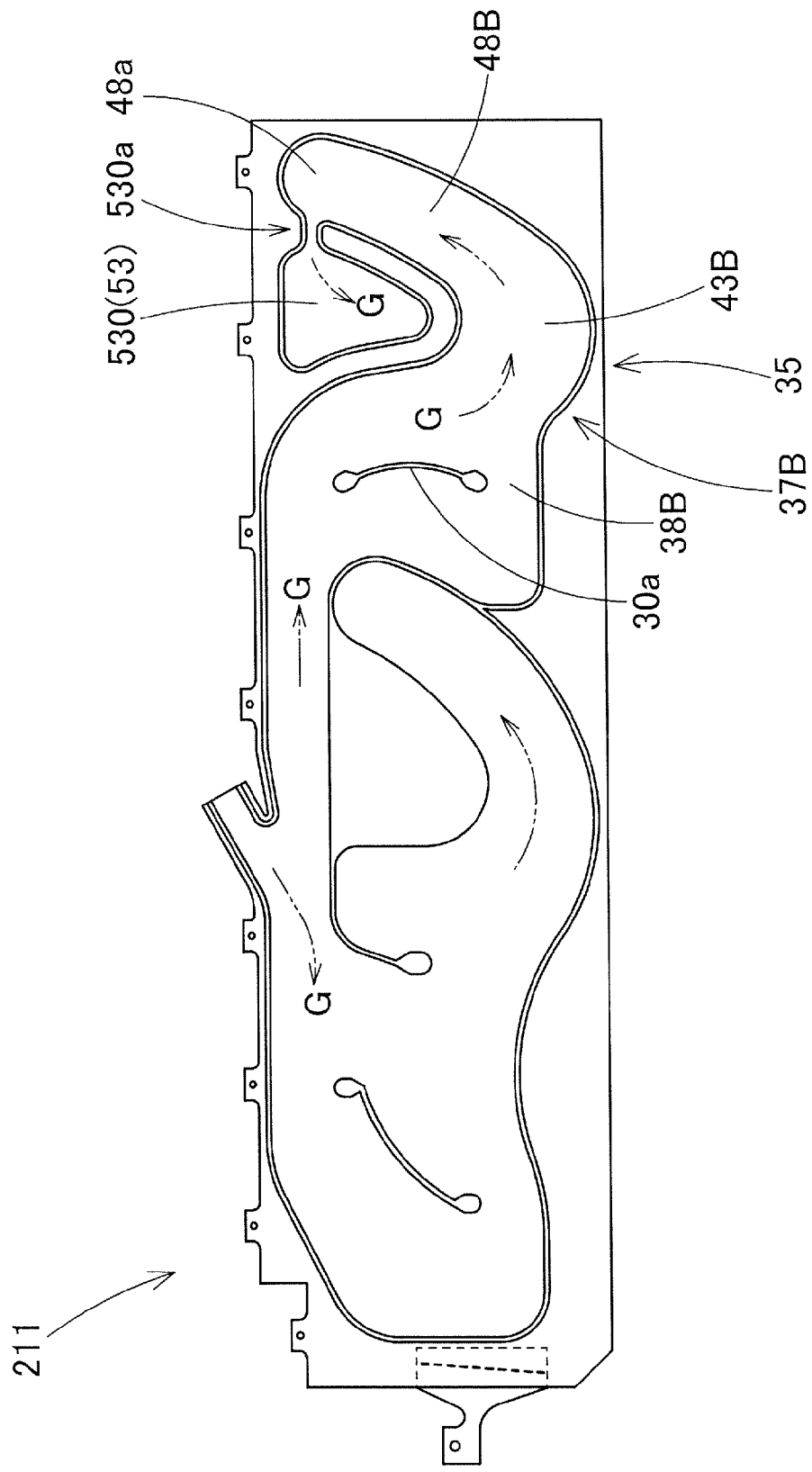
FIG. 12 is a front elevation of another modification of the airbag.
Figure 13:
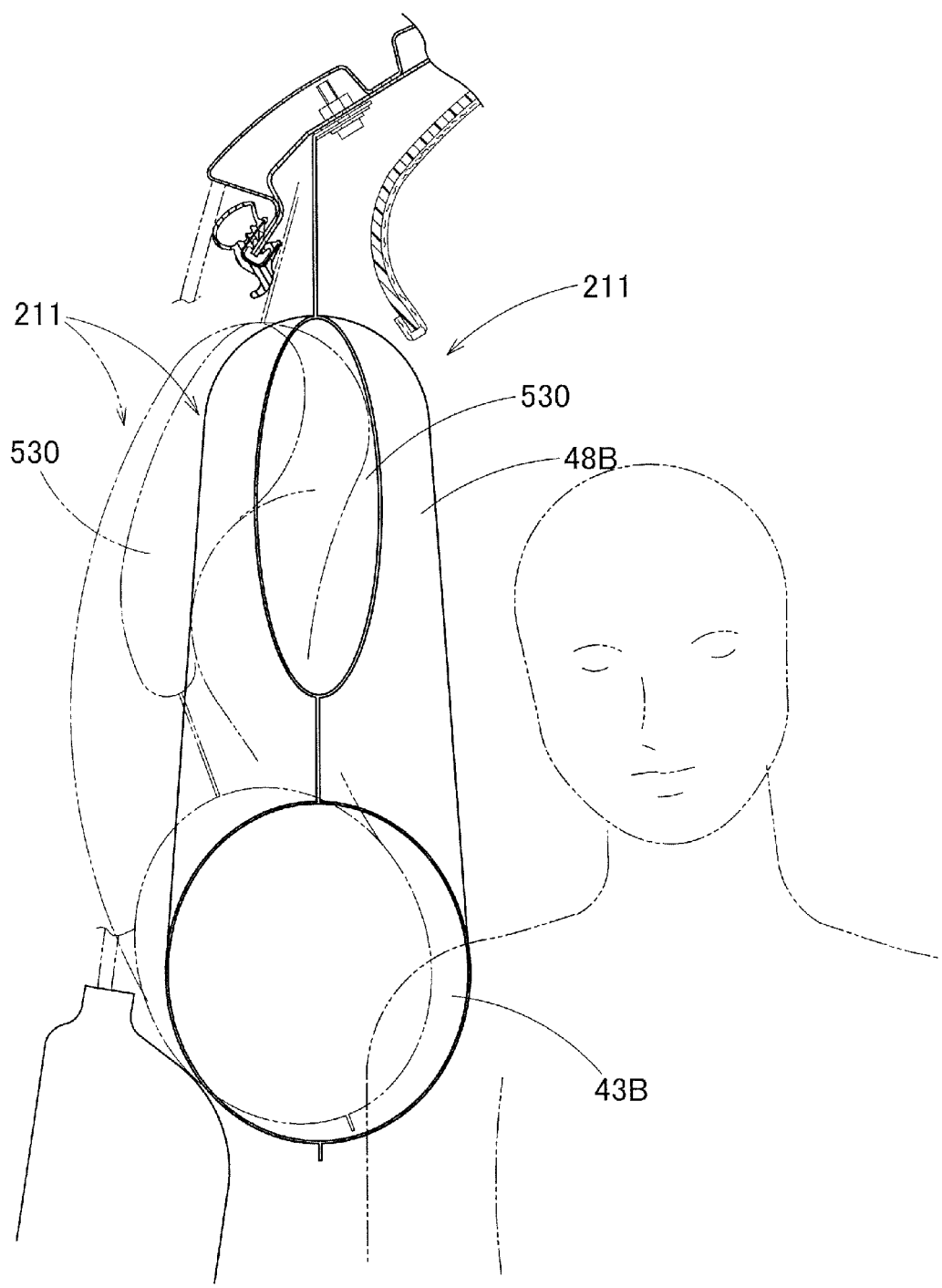
FIG. 13 is a schematic vertical section of the airbag of FIG. 12 at deployment.

FIGS. 12 and 13 depict an exemplary embodiment of the thin inflatable region. In an airbag 211 shown, a thin inflatable region 530 is formed in gas communication with the preventing region 48B via a constricted inlet port 530a. This configuration will enable the thin inflatable region 530 to absorb an inflation gas G from the preventing region 48B in such an event that a surge of an inner pressure occurs in the preventing region 48B upon cushioning an occupant. That is, the thin inflatable region 530 will act as a pressure control chamber for preventing an abrupt increase of the inner pressure of the airbag 211.

When providing the thin inflatable region 530 as a pressure control chamber, the thin inflatable region 530 may also be configured to let in an inflation gas from the pillar side region or supporting region other than let in an inflation gas from the preventing region 48B via the inlet port 530a located at the upper end 48a of the preventing region 48B as in the illustrated embodiment.

Nevertheless if the preventing region 48 is only in gas communication with the supporting region 43 and closed at the upper end 48a as in the foregoing embodiments, an ejection of an occupant will be securely prevented since the preventing region 48 will not let out an inflation gas G from the upper end 48a even at contact with an occupant C after full airbag inflation, thereby causing no plunge of inner pressure but maintaining the inner pressure and a fully inflated configuration of the preventing region 48. As a consequence, an ejection of the occupant C will be prevented in a steady manner.

If the thin inflatable region 530 is configured in gas communication with the vicinity of the upper end 48a of the preventing region 48B as shown in FIGS. 12 and 13, an opening area of the inlet port 530a from the preventing region 48B should be adequately constricted in order to prevent a pressure plunge of the preventing region 48B and maintain a rigid inflated state of the preventing region 48B while enabling the thin inflatable region 530 to act as a pressure control chamber for the preventing region 48B.

In the foregoing embodiments, the airbag is so configured that the catching point HP located in the thin panel region 53 in each of the shutter sections 34 and 35 is deployable at an outboard side of the vicinity of the head gravity center HG of an occupant C seated at an inboard side I of the window W2/W3. However, the catching point HP may also be deployable in a vicinity of the center CP of the window W2/W3 (refer to W3 in FIG. 1).

If the airbag includes more than one shutter sections for, e.g., three rows of seats or front and rear seats, the preventing element have only to be provided where needed.

What is claimed is:

1. An airbag apparatus mountable on a vehicle having a side window, a first pillar adjoining the window and a second pillar adjoining the window on the opposite side, the airbag apparatus comprising an airbag adapted to be housed in an upper edge of the window and deployable downward when fed with an inflation gas, the airbag including a shutter section that covers the window on an inboard side thereof and includes:
   a plurality of mounting portions that are formed on an upper edge of the shutter section and serve to mount the shutter section on a vehicle body structure, the mounting portions being located at least above and in vicinities of the first and second pillars;
   an inflatable region that inflates in a vehicle width direction, the inflatable region includes:
      a first pillar side inflatable region that extends vertically and covers the first pillar;
      a supporting inflatable region that extends from a lower end of the first pillar side inflatable region, the supporting inflatable region abutting against an interior surface of the vehicle body structure below a beltline of the vehicle by its outboard surface and is thereby supported by the interior surface at airbag deployment; and
      a preventing inflatable region that extends upward from the supporting inflatable region and is in gas communication with the supporting inflatable region for admitting the inflation gas from the supporting inflatable region, the preventing inflatable region being located in a vicinity of a downstream end of an inflation gas channel of the airbag and including an upper end directed toward the mounting portion located above the second pillar; and
   a thin panel region that is formed into a thin panel recessing in an outboard direction relative to the inflatable region at airbag deployment, the thin panel region being located between the first pillar side inflatable region and the preventing inflatable region and above the supporting inflatable region, and defining an occupant catching point configured to catch a vehicle occupant that is operative during a rollover event of the vehicle,
   wherein the supporting inflatable region and preventing inflatable region surround the occupant catching point continuously at the lower side and on a side of the second pillar, and
   wherein the mounting portions located above and in the vicinities of the first and second pillars, the first pillar side inflatable region, the supporting inflatable region, the preventing inflatable region and the thin panel region being configured as in combination an occupant ejection preventing element configured to prevent an occupant from ejecting out of the window that is operative during a rollover event of the vehicle.

2. The airbag apparatus of claim 1, wherein a portion with a greatest thickness in a vehicle width direction in the supporting inflatable region and preventing inflatable region is located at a region of the supporting inflatable region to be supported by the interior surface of the vehicle.

3. The airbag apparatus of claim 1 wherein the thin panel region is comprised of a noninflatable portion that admits no inflation gas.

4. The airbag apparatus of claim 1, wherein the thin panel region is comprised of a thin inflatable region that is inflatable with an inflation gas in such a manner as to be thinner than the preventing inflatable region and recess in an outboard direction relative to the preventing inflatable region.

5. The airbag apparatus of claim 4, wherein the thin inflatable region is in gas communication with an upper end of the preventing inflatable region so as to let in the inflation gas from the preventing inflatable region.

6. The airbag apparatus of claim 1, wherein the preventing inflatable region is in gas communication only with the supporting inflatable region and closed at an upper end.

7. The airbag apparatus of claim 1, wherein the occupant catching point is further configured to an outboard side of a vicinity of a center of gravity of a head of the occupant seated at an inboard side of the window.

8. The airbag apparatus of claim 1 wherein the occupant catching point is set at a vicinity of a center of the window.

9. The airbag apparatus of claim 1 wherein the preventing inflatable region at airbag deployment extends obliquely upward from the supporting inflatable region in such a manner as to divide the window front from rear as viewed from an interior of the vehicle.

10. An airbag apparatus mountable on a vehicle having a side window, a first pillar adjoining the window and a second pillar adjoining the window on the opposite side, the airbag apparatus comprising an airbag adapted to be housed in an upper edge of the window and deployable downward when fed with an inflation gas, the airbag including a shutter section that covers the window on an inboard side thereof and includes:
   a plurality of mounting portions that are formed on an upper edge of the shutter section and serve to mount the shutter section on a vehicle body structure, the mounting portions being located at least above and in vicinities of the first and second pillars;
   an inflatable region that inflates in a vehicle width direction, the inflatable region includes:
      a first pillar side inflatable region that extends vertically and covers the first pillar;
      a supporting inflatable region that extends from a lower end of the first pillar side inflatable region, the supporting inflatable region abutting against an interior surface of the vehicle body structure below a beltline of the vehicle by its outboard surface and is thereby supported by the interior surface at airbag deployment; and a preventing inflatable region that extends upward from the supporting inflatable region and is in gas communication with the supporting inflatable region for admitting the inflation gas from the supporting inflatable region, the preventing inflatable region being located in a vicinity of a downstream end of an inflation gas channel of the airbag and including an upper end directed toward the mounting portion located above the second pillar; and a thin panel region that is formed into a thin panel recessing in an outboard direction relative to the inflatable region at airbag deployment, the thin panel region being located between the first pillar side inflatable region and the preventing inflatable region and above the supporting inflatable region, and defining an occupant head catching point configured to catch a head of an occupant in a vicinity of a center thereof and at an inboard side of the window that is operative during a rollover event of the vehicle, wherein the supporting inflatable region and preventing inflatable region surround the occupant catching point continuously at the lower side and on a side of the second pillar, and wherein the mounting portions located above and in the vicinities of the first and second pillars, the first pillar side inflatable region, the supporting inflatable region, the preventing inflatable region and the thin panel region constitute in combination a preventing element that is configured to prevent an occupant from ejecting out of the window during a rollover event of the vehicle.

11. An airbag apparatus mountable on a vehicle having a side window, a first pillar adjoining the window and a second pillar adjoining the window on the opposite side, the airbag apparatus comprising an airbag adapted to be housed in an upper edge of the window and deployable downward when fed with an inflation gas, the airbag including a shutter section that covers the window on an inboard side thereof and includes:

a plurality of mounting portions that are formed on an upper edge of the shutter section and serve to mount the shutter section on a vehicle body structure, the mounting portions being located at least above and in vicinities of the first and second pillars;

an inflatable region that inflates in a vehicle width direction, the inflatable region includes:

a first pillar side inflatable region that extends vertically and covers the first pillar;

a supporting inflatable region that extends from a lower end of the first pillar side inflatable region, the supporting inflatable region abutting against an interior surface of the vehicle body structure below a beltline of the vehicle by its outboard surface and is thereby supported by the interior surface at airbag deployment; and a preventing inflatable region that extends upward from the supporting inflatable region and is in gas communication with the supporting inflatable region for admitting the inflation gas from the supporting inflatable region, the preventing inflatable region being located in a vicinity of a downstream end of an inflation gas channel of the airbag and including an upper end directed toward the mounting portion located above the second pillar; and a thin panel region that is formed into a thin panel recessing in an outboard direction relative to the inflatable region at airbag deployment, the thin panel region being located between the first pillar side inflatable region and the preventing inflatable region and above the supporting inflatable region, and defining an occupant catching point configured to catch an occupant during a rollover event of the vehicle, wherein the supporting inflatable region and preventing inflatable region surround the occupant catching point continuously at the lower side and on a side of the second pillar, and wherein an ejection-preventing element includes, in combination, the mounting portions located above and in the vicinities of the first and second pillars, the first pillar side inflatable region, the supporting inflatable region, the preventing inflatable region and the thin panel region, and the ejection-preventing element is adapted to prevent an object from falling out of the window during a rollover event of the vehicle.

* * * * *